(12) United States Patent
Fredette et al.

(10) Patent No.: US 8,390,149 B2
(45) Date of Patent: Mar. 5, 2013

(54) HARMONIC FILTER WITH INTEGRATED POWER FACTOR CORRECTION

(75) Inventors: Steven J. Fredette, South Windsor, CT (US); Rishi Grover, Manchester, CT (US)

(73) Assignee: United Technologies Corporation, East Hartford, CT (US)

( * ) Notice: Subject to any disclaimer, the term of this patent is extended or adjusted under 35 U.S.C. 154(b) by 212 days.

(21) Appl. No.: 12/735,224

(22) PCT Filed: Dec. 24, 2007

(86) PCT No.: PCT/US2007/026268
§ 371 (c)(1),
(2), (4) Date: Jun. 23, 2010

(87) PCT Pub. No.: WO2009/082375
PCT Pub. Date: Jul. 2, 2009

(65) Prior Publication Data
US 2010/0264750 A1 Oct. 21, 2010

(51) Int. Cl.
*H02J 1/02* (2006.01)
*H02M 1/12* (2006.01)
*H02M 1/14* (2006.01)

(52) U.S. Cl. .................. 307/105; 290/40 C; 363/47

(58) Field of Classification Search .................. None
See application file for complete search history.

(56) References Cited

U.S. PATENT DOCUMENTS

| | | | | |
|---|---|---|---|---|
| 5,387,821 A | * | 2/1995 | Steciuk et al. | 307/105 |
| 5,444,609 A | | 8/1995 | Swamy et al. | 363/47 |
| 7,038,329 B1 | | 5/2006 | Fredette et al. | 290/40 |
| 7,550,929 B2 | * | 6/2009 | Ger et al. | 315/282 |
| 2003/0062776 A1 | * | 4/2003 | Skibinski et al. | 307/105 |
| 2007/0151272 A1 | * | 7/2007 | Cosan et al. | 62/228.1 |

FOREIGN PATENT DOCUMENTS

| KR | 20-0344088 Y1 | 2/2004 |
|---|---|---|
| KR | 10-2006-0124825 A | 12/2006 |

OTHER PUBLICATIONS

Ahmed, Self-Excited Induction Generator with Simple Voltage Regulation Scheme for Wind Energy, Nov. 2, 2004.*
Dixon, New Topology for Harmonic-Free, Dynamic Var Compensator Using Unidirectional Power Switches, Aug. 6, 2002.*
Mahmoud, Vector Oriented Control of Voltage Source PWM Inverter As a Dynamic VAR Compensator for Wind Energy Conversion System Connected to Utility Grid, 2010.*
Wang, Dynamic Analysis of a Grid-Linked Small-Hydro Inductnion Generation System, May 12, 2004.*

(Continued)

*Primary Examiner* — Rexford Barnie
*Assistant Examiner* — Justen Fauth
(74) *Attorney, Agent, or Firm* — Stephen A. Schneeberger

(57) ABSTRACT

A distributed electrical power generating and utilizing system includes an induction generator driven by a prime mover requiring reactive power to operate for providing electrical power on a bus. The bus has a gross load and is also connectable to a utility power grid by a switch. The gross load includes at least a non-linear electrical load component, typically including a variable speed device and associated diode rectifier front end. The bus includes a harmonic filter having a power factor-correcting capacitor integrated therewith for collectively compensating harmonic distortion caused by the non-linear load component and for correcting power factor to compensate for reactive power required by at least the inductive generator.

2 Claims, 5 Drawing Sheets

OTHER PUBLICATIONS

A. M. Sharaf et al., "Dynamic Power Filter and Capacitor Compensator for Isolated Self-excited Induction Generator Driven by a Wind Turbine", 11th International Conference on Harmonics and Quality of Power (IEEE), pp. 46-49, 2004.

Shashank Wekende et al., "Simple Control for a Wind Driven Induction Generator", IEEE Industry Applications Magazine, pp. 44-53, 2001.

* cited by examiner

HARMONIC FILTER WITH INTEGRATED POWER FACTOR CORRECTION

TECHNICAL FIELD

This disclosure relates to electrical power generation and utilization, and more particularly to distributed electrical power generation and utilization systems. The disclosure relates even more particularly to power quality concerns associated with certain generators and load-types connected to the utility grid.

BACKGROUND ART

Entities other than the utility power grid now frequently generate electrical power for local or dedicated uses, as well for connection to the utility grid to generate revenues and/or offset costs. Such systems may be referred to as having a dual, or multiple, sourced power bus.

In some electric power generating systems, the manner of managing the energy that will operate the electric generator may require auxiliary equipment, such as pumps and fans. An example is a power system which recovers heat, from such sources as geothermal wells, food processing plants or landfills, or the like, utilizing an Organic Rankin Cycle system.

For economic efficiency, it is desirable that a low cost generator provide power for all auxiliary equipment, while at the same time providing power which has shape (little or no harmonic distortion), power factor (PF), and frequency that are all suitable for interface with the utility power grid. Synchronous generators are typically more expensive and require additional controls compared with other, cheaper generators such as induction generators which, because of their construction, are less expensive than synchronous generators. However, induction generators have an inherently lower power factor (PF) than what is typically acceptable to utility grids. Moreover, to the extent certain types of non-linear loads, such as variable-speed drives with diode front ends, are associated with the auxiliary equipment, high levels of harmonic distortion may occur in the current.

An example of the conditions described in the foregoing paragraph may be seen in the characterization of the "prior art" (FIG. 1 therein) described in U.S. Pat. No. 7,038,329 (hereinafter '329) to S. J. Fredette, et al for "Quality Power From Induction Generator Feeding Variable Speed Motor", the disclosure of which is incorporated herein by reference to the extent consistent and appropriate. Similar thereto is the following characterization herein of that "prior art" as it is depicted in FIG. 1 herein.

Referring to FIG. 1 herein of the "prior art", there is depicted a single line of a typically multi-phase (typically 3-phase) power system in which an induction electric power generator 10, driven by some form of prime mover 12, is connected, or connectable, with the utility power grid 14 via power bus 16 including switch 18, typically a breaker or contactor. Moreover, there is depicted broadly in block form, one or more non-linear loads 20, typically including variable speed drives with diode rectifier front ends and associated with the auxiliary loads, operatively connected to the power bus 16. Those non-linear loads, and particularly the variable speed drives with diode rectifier front ends, are the same or similar to elements 11, 12, 13 and 16 of FIG. 1 of the aforementioned '329 patent. Because the induction generator requires reactive power to operate, the reactive power is provided by a power factor correction capacitor ($C_{pfc}$) 22 in order to maintain the power factor at the interface with the utility grid above limits imposed by accepted standards. The power factor limits are normally above 90%, and mainly above about 95%. The power factor correction capacitor(s) 22 is typically connected in shunt with the non-linear loads 20. Still further, to address the significant levels of harmonic distortion in the current that may be introduced by the non-linear loads 20, one or more harmonic filter(s) 24, is/are connected in series with the non-linear loads 20. A source inductance ($L_s$) 26 is represented in the power bus 16 as being the inductance of the power grid 14 and any interface transformer at or near the installation site, and an illustrated source resistance 27 is of similar origins.

As shown in FIG. 1 herein, as well as in FIG. 1 of the aforementioned '329 patent, the power factor correction capacitor ($C_{pfc}$) 22 and the harmonic filter(s) 24 are separate and distinct from one another. Stated another way, one may be said to be external to the other. Indeed, although the harmonic filter 24 may include a filter capacitor or capacitance in combination with one or more inductive impedance elements to provide the requisite filtering of the harmonics, such capacitor is separate from the power factor correction capacitor ($C_{pfc}$) 22.

The prior art configuration of FIG. 1 will be further understood in the context of prior art FIG. 2, which is substantially the same as FIG. 1 but configured to illustrate the harmonic filter 24 and the power factor correction capacitor 22 in greater detail and as separate from one another. The AC power grid and the induction power generator are collectively represented by section block 100 containing the AC source 114, the inductive source impedance 126, the source resistance 127, and induction generator 110. Correspondingly, the current to the various loads, including the non-linear loads, is represented by the current source symbol 120. Intermediate the AC source 114 and the output load current 120 are separate section blocks 122 and 124, representing the power factor correction capacitor 22 and the harmonic filter 24, respectively, of FIG. 1.

The power factor correction block 122 includes a power factor correction capacitor 22 having a detuning inductor ($L_{det}$) 30 in series therewith, and is connected across the AC source 114 and across the induction generator 110. The inductor 30 is required to form a resonant tank so as to limit harmonic currents from flowing to the capacitor(s) and thereby causing excessive heating, which may be life-limiting.

Similarly, the harmonic filter section block 124 representing the harmonic filter 24 of FIG. 1 is also connected across the AC source 114 in a general "T" network including, more specifically, a "bridged-T". The cross arm of the general T harmonic filter section block 124 includes several inductances arranged or depicted in series, including an input inductance ($L_{in}$) 32 shown connected at one end to the junction of the source inductance 126 or the source resistance 127 and the detuning inductance 30, and at the other end to the cross arm of a bridged-T comprising a parallel-bridged arrangement of a further inductance ($L_1$) 34 connected in parallel with a series connection of a resistance (R) 36 and a filter inductance ($L_f$) 38. The cross arm of the general T filter network is completed by the connection at the junction of inductances 34 and 38 of one end of a still further inductance ($L_2$) 40, the other end of which is connected to one side of the non-linear load(s) represented by the current source 120. A filter capacitor ($C_f$) 42 is connected at one end to the junction between the resistance 36 and the filter inductance 38 and is thereafter connected in shunt with the power source 114 and current source 120 to complete the "vertical arm" of the bridged-T filter.

While the afore-described arrangement is effective in maintaining acceptable power factor in the presence of the induction generator and of also reducing or eliminating the harmonic distortion introduced by the non-linear loads, especially as represented by the variable speed drives with diode rectifier front ends, it nonetheless comes at significant parts count and cost of equipment. More specifically, the ratings required of the filter capacitor(s) and the power factor correction capacitor(s) cause them to be relatively large and expensive. Although the insulated gate bipolar transistor switched bridge and associated control circuitry of the aforementioned '329 patent do provide a good quality of power without power factor correction and with little or no harmonic distortion, that circuitry itself comes at a significant cost or expense, such that it may not be a particularly acceptable trade-off.

Accordingly, what is needed is an arrangement in which an induction generator and associated non-linear loads are connectable to the utility power grid and operate with an acceptable power factor and minimal harmonic distortion, yet are reliable and cost effective in attaining that result.

SUMMARY

The present disclosure provides a distributed electrical power generating and utilizing system having an induction generator driven by a prime mover and requiring reactive power to operate for providing electrical power on a bus, the bus having a gross load and also being connectable to a utility power grid by a switch, such as a circuit breaker or contactor; the gross load including at least a non-linear electrical load component; and also connected to the bus is a harmonic filter having a power factor-correcting capacitor integrated therewith for collectively compensating harmonic distortion caused by the non-linear load component and for correcting power factor to compensate for reactive power required by at least the induction generator. The integrated capacitor(s) in the harmonic filter contain(s) series inductance to form a tank circuit to reduce harmful effects of harmonic currents on the capacitor life. Further, the capacitor required of the harmonic filter will, if sized appropriately, also serve as the power factor correction capacitor. Multiple such capacitors may be switched into or out of the circuit to improve dynamic voltage stability at light loading conditions. Typically, a harmonic filter having a power factor-correcting capacitor integrated therewith is provided for each phase of the power generating system.

The non-linear load component may typically include variable speed drives with diode rectifier front ends.

A process flow routine is disclosed for guiding the design of the harmonic filter with integrated power factor correction. Values for input variables such as power of the generator, power of variable speed drives, power factor of generator, power factor of grid, quality factor, resonance, anti-resonance, and source/grid inductance, resistance and % impedance are selected to calculate the requisite values for the capacitance, inductance and resistance associated with the integrated harmonic filter and power factor-correcting capacitor.

The foregoing features and advantages of the present disclosure will become more apparent in light of the following detailed description of exemplary embodiments thereof as illustrated in the accompanying drawings.

DETAILED DESCRIPTION

Figure 1:
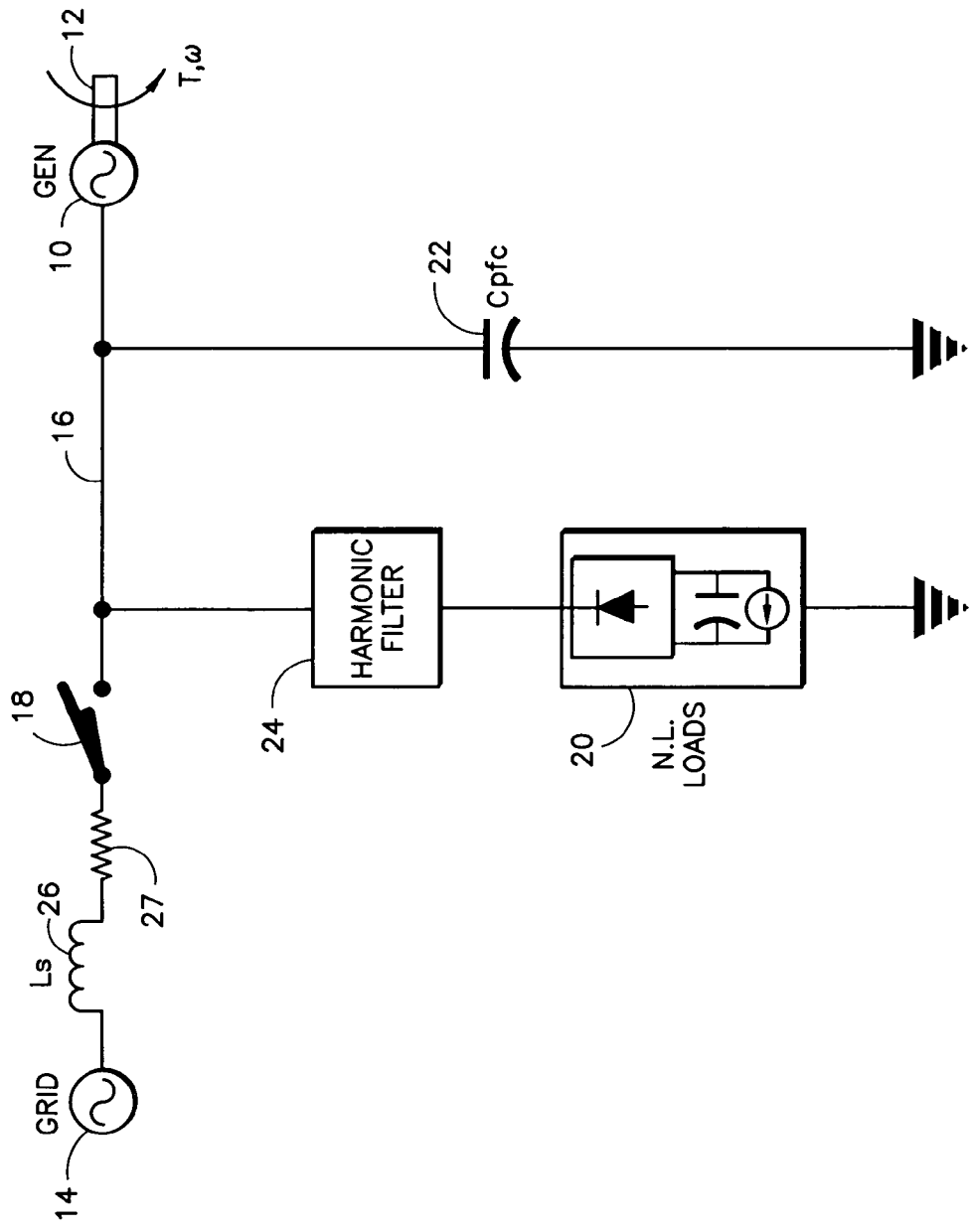
FIG. 1 is a simplified schematic block diagram of one phase of an exemplary electric power generation system having an induction generator powering at least non-linear loads and providing power to a power utility grid, and depicting a harmonic filter and separate power factor correction capacitor as known in the prior art.
Figure 2:
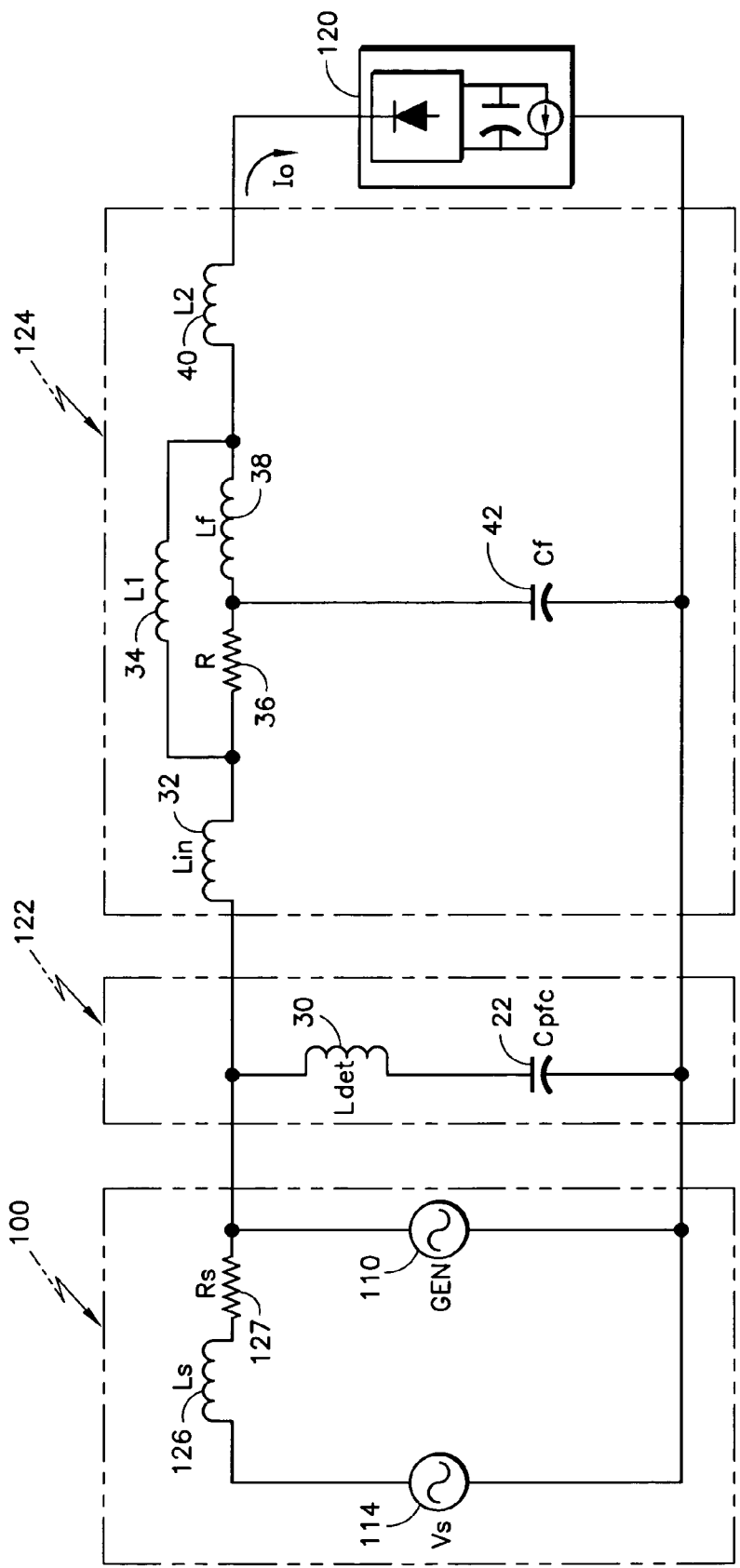
FIG. 2 is a further depiction of the prior art system of FIG. 1, illustrating the harmonic filter and separate power factor correction capacitor in further detail.
Figure 3:
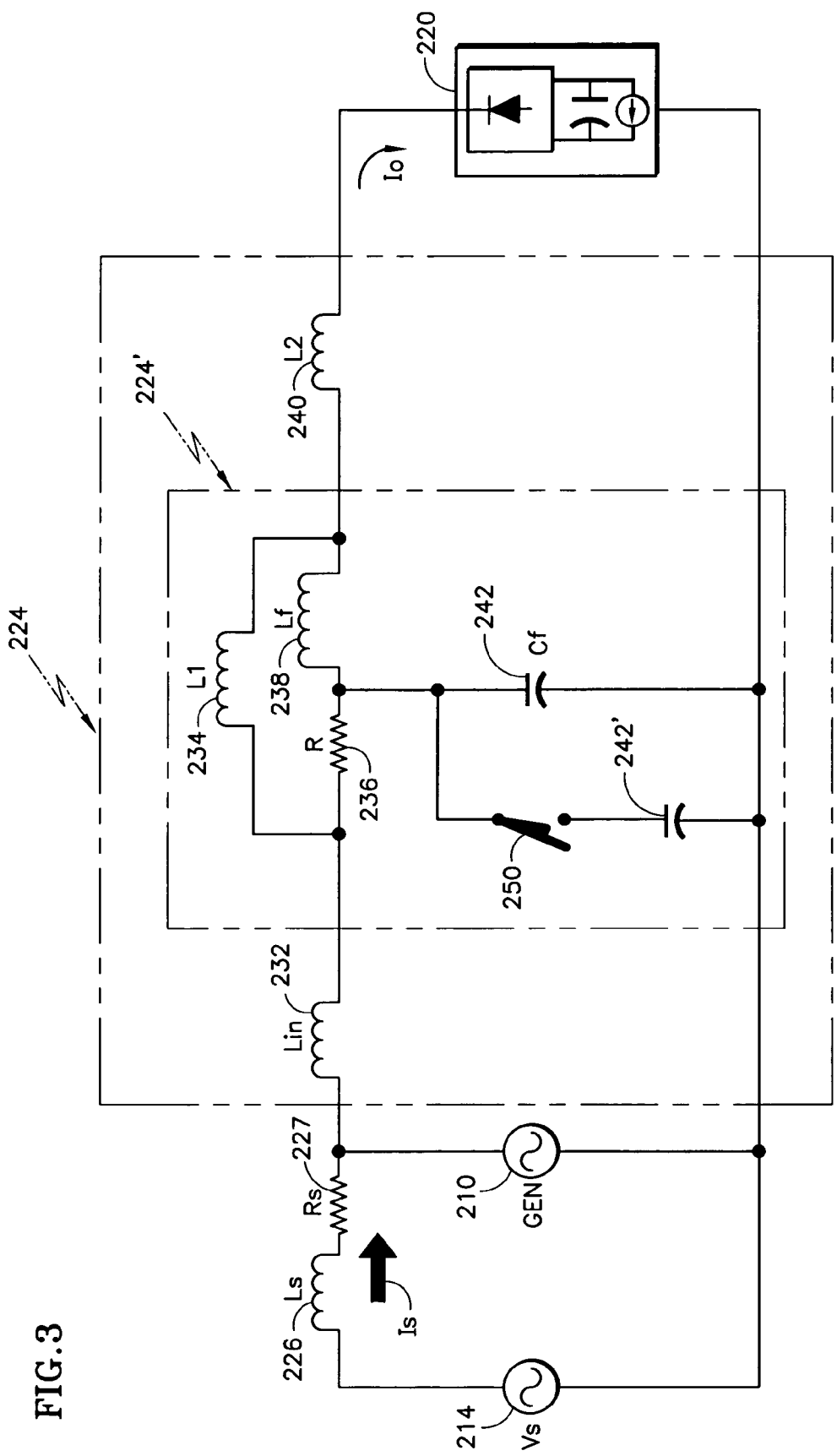
FIG. 3 is an illustration similar to FIG. 2 of one phase of an exemplary electric power generation system having an induction generator powering at least non-linear loads and providing power to a power utility grid, and illustrating the harmonic filter having a power factor-correcting capacitor integrated therewith in accordance with the present disclosure.

Referring to FIG. 3, there is illustrated one phase of an exemplary electric power generation system having an induction generator powering at least non-linear loads and providing power to a power utility grid, and particularly illustrating the harmonic filter having a power factor-correcting capacitor integrated therewith in accordance with the present disclosure. It will be noted that in many respects the system of FIG. 3 is similar to or the same as that of FIGS. 1 and 2. This is particularly so with respect to the inclusion, implied herein but not again shown for the sake of brevity, of an induction generator providing power to the non-linear loads including, for example, variable speed drives with diode rectifier front ends, and being connected, or connectable, with the utility power grid via a power bus. However, the system of FIG. 3 differs in that the harmonic filter for each phase has the power factor correction capacitor, or capacitors, integrated therewith, and thus avoids at least the cost of a separate capacitor for that latter function, as had been the case with the prior art.

Referring to FIG. 3 in greater detail, the AC power grid and the induction power generator are collectively represented by voltage source 214 and the induction generator is represented by voltage source 210. Associated with that voltage source are a source inductance 226 and a source resistance 227. Correspondingly, the current to the various loads, including the non-linear loads, is represented by $I_0$, and is depicted as being associated with the non-linear loads represented broadly by block 220 that includes the symbol of a rectifier to represent a variable speed drive and associated diode rectifier front end, similar to 120 in FIG. 2. Intermediate the AC voltage source 214 and the output load current 220 is a generalized T filter 224 which includes the more specific bridged-T harmonic filter 224'.

Although the component configuration of the generalized T filter 224 of FIG. 3 is substantially the same as that of FIG. 2, it now integrates the component(s) and function(s) of both power factor correction and harmonic filter into this singular harmonic filter configuration. More particularly, the cross arm of the generalized T harmonic filter section block 224 includes several inductances arranged or depicted in series, including an input inductance ($L_{in}$) 232 shown connected at one end in series with the source inductance 226 and source resistance 227 and at the other end to the cross arm of a bridged-T comprising a parallel-bridged arrangement of a further inductance ($L_1$) 234 connected in parallel with a series connection of a resistance (R) 236 and a filter inductance ($L_f$) 238. The cross arm of the generalized T filter network is completed by the connection at the junction of inductances 234 and 238 of one end of a still further inductance ($L_2$) 240, the other end of which is connected to one side of the non-linear load(s) represented by the current source 220. A filter capacitor ($C_f$) 242 is connected at one end to the junction between the resistance 236 and the filter inductance 238 and is thereafter connected in shunt with the voltage source 214 and the load current source 220 to complete the "vertical arm" of the bridged-T filter.

Importantly, the filter capacitor 242 is sized to serve the additional function of power factor correction, such that both the functions of harmonic filtering and power factor correction are integrated into a single capacitor, or bank of capacitors, without the costly requirement of a separate power factor correction capacitor. Principal factors in the sizing of the capacitor(s) are the power, P, of the non-linear loads and reactive power, Q, of the induction generator, etc. This capability is further facilitated by the fact that the integrated capacitor(s) 242 in the harmonic filter 224 already contains series inductance to form a tank circuit to greatly reduce the effects of harmonic currents from either the non-linear loads or the utility grid on the capacitor'(s) life. That series inductance is that depicted as the inductances 232, 238, and 240 in FIG. 3. Still further, and depending on the requirement for power factor correction, one or more additional capacitors 242' can be switched, as by switch 250, into and out of connection directly in parallel with the basic filter capacitor 242 to improve voltage stability on the system at light loading conditions. More specifically, capacitors may be switched out at lighter loads, thereby reducing the reactive current provided by the capacitor and thus preventing voltage instabilities at the grid interface.

Figure 4:
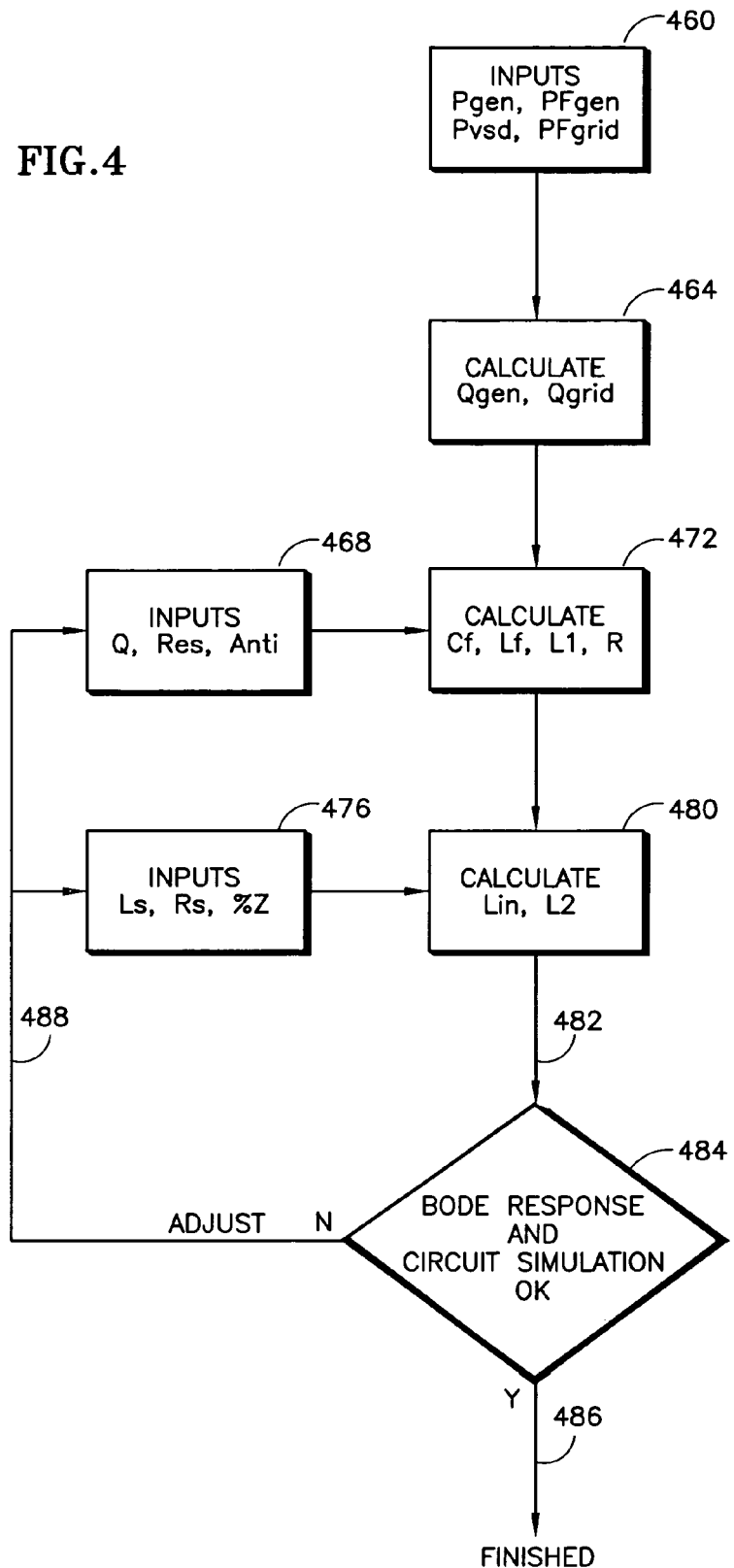
FIG. 4 is a simplified flow diagram illustrating the process and parameters for guiding the design of the FIG. 3 harmonic filter having a power factor-correcting capacitor integrated therewith in accordance with the present disclosure.

Referring to FIG. 4, a simplified flow diagram illustrates the process and parameters for guiding the design of the FIG. 3 harmonic filter having a power factor-correcting capacitor integrated therewith in accordance with the present disclosure. The flow diagram is depicted in a very general sense, and utilizes a number of input variables to calculate the component values of the various inductances, capacitance(s) and resistance(s) that make up the general harmonic filter 224, and especially the bridged-T portion 224' of that filter. Block 460 indicates the use of input variables for generator nameplate power ($PF_{gen}$), generator nameplate power factor ($PF_{gen}$), required grid power factor ($PF_{grid}$), and power to variable speed devices ($P_{vsd}$) in the calculation or computation at block 464 of values for the reactive power for the generator and for the grid ($Q_{gen}$ and $Q_{grid}$, respectively). Further input variables, seen in block 468, include the quality factor, Q, and the resonance and anti-resonance frequencies, designated Res and Anti, respectively. The resonance and anti resonance frequencies are the frequencies at which the filter is designed to get the appropriate attenuation of harmonics. These input variables, in combination with the calculated values of $Q_{gen}$ and $Q_{grid}$ from block 464, are utilized at block 472 to calculate component values for the filter capacitor ($C_f$) 242, the filter inductance ($L_f$) 238, the inductance ($L_1$) 234, and the resistance (R) 236. Still further, input variables, seen in block 476, include the source inductance ($L_s$) 226, the source resistance ($R_s$) 227, and % Z, which is the measure of grid "stiffness" and is an important factor in sizing the filter. These input variables, in combination with the calculated values of $C_f$, $L_f$, $L_1$ and R from block 472, are utilized at block 480 to calculate component values for input inductance ($L_{in}$) 232 and the further inductance ($L_2$) 240. The component values calculated in blocks 472 and 480 are then provided on line 482 to a function block 484 at which is conducted a Bode or frequency response and circuit simulation analysis. If that analysis provides desired results, the process is complete, as indicated by the Finish arrow 486. If the response analysis is not within the desired range, adjustment is made to one or more of the variables in blocks 468 and/or 476, as indicated by the Adjust arrow or line 488.

The array of equations that follows is intended to supplement the foregoing general description of the FIG. 4 flow diagram for guiding the design of the FIG. 3 harmonic filter having a power factor-correcting capacitor integrated therewith. Those equations are:

$$P_{grid} = P_{gen} - P_{vsd} \tag{Eq. 1}$$

$$Q_{grid} = P_{grid}\tan(\cos^{-1}(PF_{grid})) \tag{Eq. 2}$$

$$Q_{gen} = P_{gen}\tan(\cos^{-1}(PF_{gen})) \tag{Eq. 3}$$

$$C_f = \frac{Q_{gen} - Q_{grid}}{\omega V_{LL}^2} \tag{Eq. 4}$$

$$L_f = \frac{1}{C_f \omega_s^2} \tag{Eq. 5}$$

$$R = \frac{Q_s}{\omega_s C_f} \tag{Eq. 6}$$

$$L_1 = \left(\frac{\omega_p R C_f}{Q_p} - 1\right) L_f \tag{Eq. 7}$$

$$L_{in} = \left(\frac{Z_\% V_{LL}}{100\omega\sqrt{3}\, I_{vsd}}\right) - L_s \text{ (if } L_{in} < 0, \text{ then } L_{in} = 0) \tag{Eq. 8}$$

$$L_2 = L_{in} \text{ (if } L_{in} < 0, L_2 = L_s), \tag{Eq. 9}$$

where the parameters not mentioned earlier but included in the equations include: $V_{LL}$, which is the line-to-line voltage, which in north America is 480V; $Z_\%$, which is the percentage of impedance from a normalized (per unit) set and is the measure of grid "stiffness", and is an important factor in sizing the filter; $\sqrt{3}I_{vsd}$, where $I_{vsd}$ is the current to the variable speed device(s), and the square root of 3 is used because the illustrated system is 3 phase and when you compute power using $V_{LL}$ it requires the square root of 3. Further still, $Q_p$ and $Q_s$ are the series and parallel quality factors corresponding to the resonance and anti resonance points. $\omega_s$ and $\omega_p$ are the series and parallel (resonance and anti resonance) frequencies. Note that the series resonance is the higher frequency (lower impedance) portion of FIG. 5, while the parallel resonance is the lower frequency (higher impedance).

Figure 5:
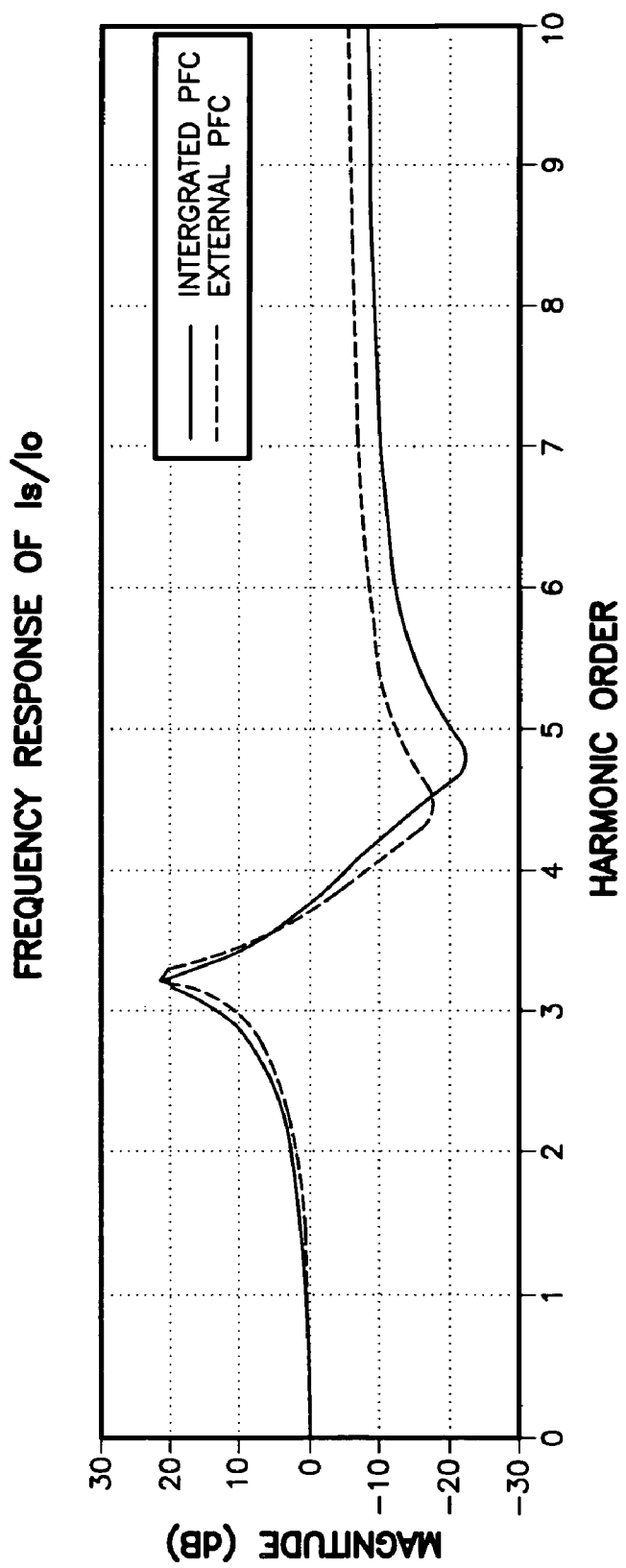
FIG. 5 is a frequency response graph showing a filter designed with integrated power factor correction capacitor(s) vs. a filter designed with external power factor correction capacitor(s).

Referring briefly to FIG. 5, there is illustrated a frequency response graph showing a filter designed with integrated power factor correction capacitor(s) vs. a filter designed with external power factor correction capacitor(s). The resonance and anti resonance frequencies are selected such that the filter design yields appropriate attenuation of the harmonics. Most significantly, using the design process described with reference to FIG. 4 and yielding the integrated harmonic filter and power factor correction functions of FIG. 3, it is to be noted in FIG. 5 that the performance of the system having the disclosed integrated PFC performs very nearly the same as a system for which the PFC is external to (or separate from) the harmonic filter.

Although the disclosure has been described and illustrated with respect to the exemplary embodiments thereof, it should be understood by those skilled in the art that the foregoing and various other changes, omissions and additions may be made without departing from the spirit and scope of the invention.

What is claimed is:

1. A distributed electrical power generating and utilizing system, comprising:
   an induction generator driven by a prime mover requiring reactive power to operate for providing electrical power on a bus;
   said bus having a gross load and also being connectable to a utility power grid by a switch;
   said gross load including at least a non-linear electrical load component; and
   said bus including a harmonic filter having a power factor-correcting capacitor integrated therewith for collectively compensating harmonic distortion caused by the non-linear load component and for correcting power factor to compensate for reactive power required by at least the inductive generator, the harmonic filter normally including a capacitor and wherein the harmonic filter capacitor is sized to serve also as the power factor correcting capacitor whereby the power factor-correcting capacitor is integrated with the harmonic filter, and said integrated capacitor(s) in the harmonic filter contain(s) series inductance to form a tank circuit to reduce harmful effects of harmonic currents on the capacitor.

2. A distributed electrical power generating and utilizing system, comprising:
   an induction generator driven by a prime mover requiring reactive power to operate for providing electrical power on a bus;
   said bus having a gross load and also being connectable to a utility power grid by a switch;
   said gross load including at least a non-linear electrical load component; and
   said bus including a harmonic filter having a power factor-correcting capacitor integrated therewith for collectively compensating harmonic distortion caused by the non-linear load component and for correcting power factor to compensate for reactive power required by at least the inductive generator, the harmonic filter normally including a capacitor and wherein the harmonic filter capacitor is sized to serve also as the power factor correcting capacitor whereby the power factor-correcting capacitor is integrated with the harmonic filter, and wherein the integrated capacitor is comprised of multiple capacitors, with one or more of the multiple capacitors being selectively connectable with and unconnectable from, at least another one of said multiple capacitors to improve dynamic voltage stability of the system at light loading conditions.

* * * * *